US012566692B2

(12) United States Patent
Hahn et al.

(10) Patent No.: US 12,566,692 B2
(45) Date of Patent: Mar. 3, 2026

(54) DATA STORAGE DEVICE AND METHOD FOR DATA PROCESSING OPTIMIZATION FOR COMPUTATIONAL STORAGE

(71) Applicant: Sandisk Technologies, Inc., Milpitas, CA (US)

(72) Inventors: Judah Gamliel Hahn, Ofra (IL); Ariel Navon, Revava (IL); Alexander Bazarsky, Holon (IL); Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/640,166

(22) Filed: Apr. 19, 2024

(65) Prior Publication Data

US 2025/0328458 A1     Oct. 23, 2025

(51) Int. Cl.
*G06F 12/02* (2006.01)

(52) U.S. Cl.
CPC .................................. *G06F 12/023* (2013.01)

(58) Field of Classification Search
CPC .... G06F 12/02; G06F 12/0123; G06F 12/023; G06F 12/0215
See application file for complete search history.

(56) References Cited

U.S. PATENT DOCUMENTS

| 9,753,962 | B2 | 9/2017 | Petschulat et al. |
| 10,366,247 | B2 | 7/2019 | Beecham et al. |
| 10,564,850 | B1* | 2/2020 | Gud ...................... G06F 3/0608 |
| 11,611,441 | B2 | 3/2023 | Beecham et al. |
| 11,775,873 | B2 | 10/2023 | Wang et al. |
| 2012/0303868 | A1* | 11/2012 | Tucek ...................... G06F 12/10 |
| | | | 711/E12.001 |
| 2014/0231954 | A1 | 8/2014 | Lue |
| 2015/0293986 | A1 | 10/2015 | Verge |
| 2016/0267142 | A1* | 9/2016 | Cafarella .......... G06F 16/24568 |
| 2017/0076768 | A1* | 3/2017 | Son ..................... G06F 13/1673 |
| 2019/0129834 | A1* | 5/2019 | Purkayastha .......... G06N 20/00 |
| 2020/0310986 | A1* | 10/2020 | Kang ...................... G06F 12/10 |
| 2021/0255786 | A1 | 8/2021 | Mendiola et al. |
| 2021/0294805 | A1 | 9/2021 | Damodaran et al. |
| 2022/0197544 | A1* | 6/2022 | Lee ...................... G06F 3/0655 |
| 2022/0261184 | A1* | 8/2022 | Mylavarapu .......... G06F 3/0644 |

(Continued)

OTHER PUBLICATIONS

Z. Han, G. Qu, D. Burkard and K. Dobbins, "A Memory Access Pattern-Based Program Profiling System for Dynamic Parallelism Prediction," 2016 IEEE Trustcom/BigDataSE/ISPA, Tianjin, China, 2016, pp. 1448-1454.*

(Continued)

*Primary Examiner* — Pierre Michel Bataille
(74) *Attorney, Agent, or Firm* — Crowell & Moring LLP

(57) ABSTRACT

A data storage device and method for data processing optimization for computational storage are disclosed. In one embodiment, a data storage device is provided comprising a memory and one or more processors. The one or more processors, individually or in combination, are configured to: receive data to be written in a data structure; analyze the data for a predetermined pattern; write the data in a plurality of storage locations in the memory; and write, in the memory, information about which storage locations store the predetermined pattern. Other embodiments are disclosed.

20 Claims, 7 Drawing Sheets

(56)                References Cited

U.S. PATENT DOCUMENTS

| | | |
|---|---|---|
| 2022/0261317 A1 | 8/2022 | Vijayan |
| 2022/0309549 A1 | 9/2022 | Xu et al. |
| 2024/0005204 A1* | 1/2024 | Lee ...................... G11C 7/1066 |
| 2025/0184313 A1* | 6/2025 | Johnson .................... H04L 9/50 |

OTHER PUBLICATIONS

X. Xu, Z. Cai, J. Liao and Y. Ishiakwa, "Frequent Access Pattern-based Prefetching Inside of Solid-State Drives," 2020 Design, Automation & Test in Europe Conference & Exhibition (DATE), Grenoble, France, 2020, pp. 720-725.*

Emmanuel, T. et al.; "A survey on missing data in machine learning"; downloaded from the Internet on Oct. 1, 2024 at *A survey on missing data in machine learning | Journal of Big Data | Full Text* (springeropen.com); Journal of Big Data; Dec. 2021; 37 Pages.

Ma, D. et al.; "Dr. DNA: Combating Silent Data Corruptions in Deep Learning using Distribution of Neuron Activations"; downloaded from the Internet on Oct. 1, 2024 at *3620666.3651349* (acm.org); InProceedings of the 29th ACM International Conference on Architectural Support for Programming Languages and Operating Systems, vol. 3; Apr. 27, 2024; 14 pages.

"Nvm Express® Computational Programs Command Set Specification"; Revision 1.0; downloaded from the Internet on Oct. 1, 2024 at https://nvmexpress.org/wp-content/uploads/NVM-Express-Computational-Programs-Command-Set-Specification-1.0-2023.12.20.pdf; NVM Express, Inc.; Dec. 20, 2023; 40 Pages.

"Nvm Express® Computational Programs Command Set Specification"; Revision 1.0a; downloaded from the Internet on Oct. 1, 2024 at https://nvmexpress.org/wp-content/uploads/NVM-Express-Computational-Programs-Command-Set-Specification-1.0a-2024.07.09-Ratified.pdf; NVM Express, Inc.; Jul. 9, 2024; 40 Pages.

International Search Report mailed Jul. 16, 2025 for International Application No. PCT/US2025/011190.

Written Opinion mailed Jul. 16, 2025 for International Application No. PCT/US2025/011190.

* cited by examiner

DATA STORAGE DEVICE AND METHOD FOR DATA PROCESSING OPTIMIZATION FOR COMPUTATIONAL STORAGE

BACKGROUND

A data storage device can be used to store a database (or other data structure), which can be read by a host. When processing the database for data analysis, the host may need for perform value replacement (e.g., the completion and/or replacing of missing values inside the database when a "not a number (NaN)" is written instead of a value). After the host reads the database from the data storage device, the host can replace the NaN values with some default values, such as 0 or an average column value.

DETAILED DESCRIPTION

Figures 1A, 1B, 1C:
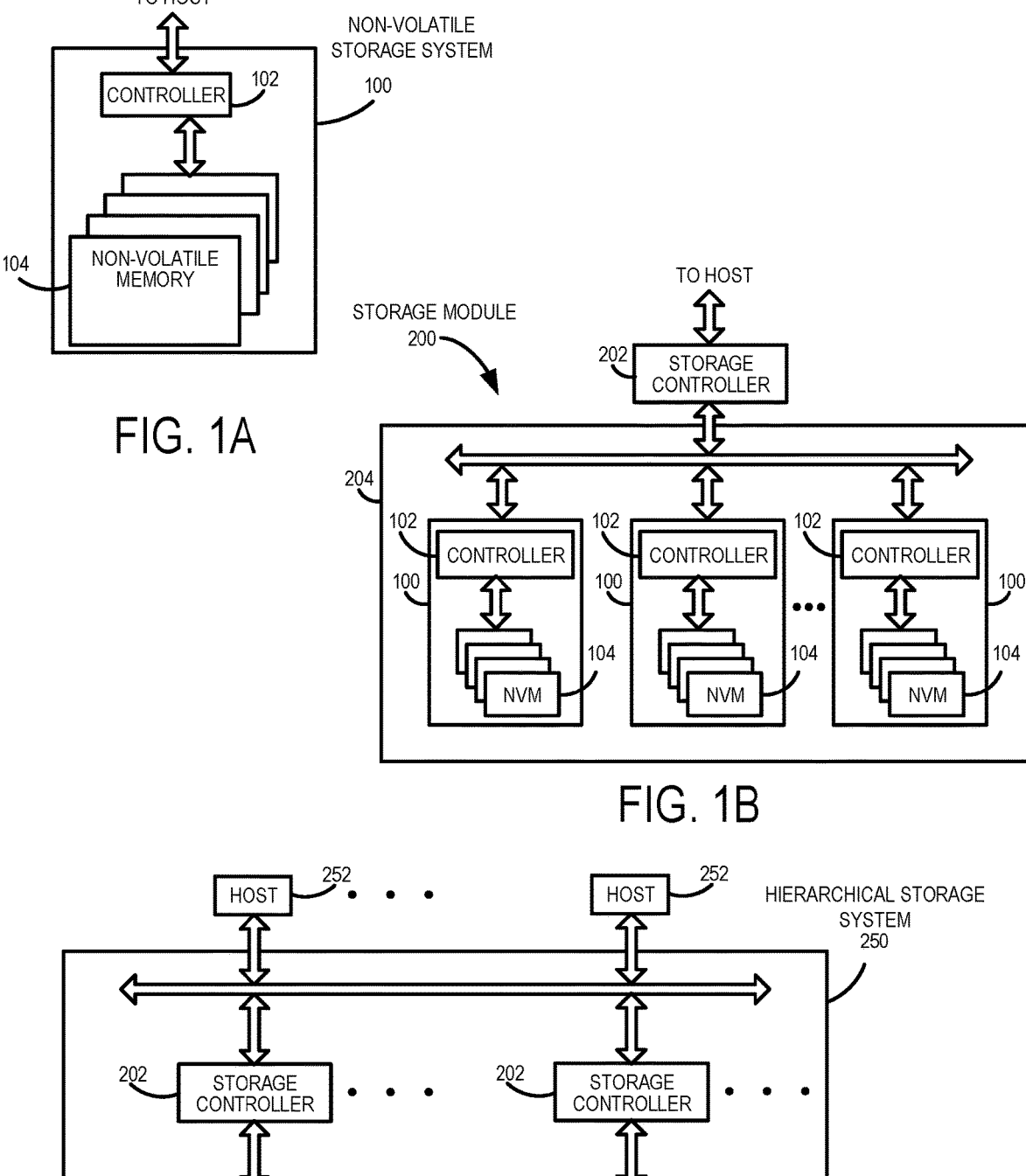
FIG. 1A is a block diagram of a data storage device of an embodiment.
FIG. 1B is a block diagram illustrating a storage module of an embodiment.
FIG. 1C is a block diagram illustrating a hierarchical storage system of an embodiment.

The following embodiments generally relate to a data storage device and method for data processing optimization for computational storage. In one embodiment, a data storage device is provided comprising a memory and one or more processors. The one or more processors, individually or in combination, are configured to: receive data to be written in a data structure; analyze the data for a predetermined pattern; write the data in a plurality of storage locations in the memory; and write, in the memory, information about which storage locations store the predetermined pattern.

In some embodiments, the one or more processors, individually or in combination, are further configured to: in response to receiving a request from a host to read the data structure, use the information about which storage locations store the predetermined pattern to perform on-the-fly replacement of the predetermined pattern with a replacement pattern during a read operation.

In some embodiments, the request comprises a computational read with replacement; and the one or more processors, individually or in combination, are further configured to: in response to receiving a request from the host to read the data structure without replacement, read the data from the memory and provide the data to the host without replacing the predetermined pattern with the replacement pattern.

In some embodiments, the predetermined pattern comprises a "not a number (NaN)" character and the replacement pattern comprises a number.

In some embodiments, the predetermined pattern comprises a specific character.

In some embodiments, the predetermined pattern comprises a regular expression.

In some embodiments, the predetermined pattern comprises a predefined bit sequence.

In some embodiments, the information about which storage locations store the predetermined pattern is stored in a page-plus-offset format.

In some embodiments, the information about which storage locations store the predetermined pattern is stored in a compressed format.

In some embodiments, the predetermined pattern, the replacement pattern, and/or a granularity of replacement is defined by a host provide the data to be stored in the data storage device.

In some embodiments, the predetermined pattern is represented as values of a key value (KV) pair.

In some embodiments, the data structure comprises a data base.

In some embodiments, the memory comprises a three-dimensional memory.

In another embodiment, a method is provided that is performed in a data storage device comprising a memory. The method comprises: identifying a set of characters in data to be stored in a data structure in the memory; storing information about where the set of characters is stored in the memory; and in response to a request from a host to read the data: using the information to replace the set of characters with a replacement set of characters; and providing the host with the data comprising the replacement set of characters.

In some embodiments, the method further comprises informing the host that the replacement set of characters changed a length of a read payload.

In some embodiments, the method further comprises allocating an additional buffer to accommodate the changed length.

In some embodiments, the method further comprises reducing whitespace defined in a comma-separated value (CSV) file to accommodate the changed length.

In some embodiments, replacing the set of characters with the replacement set of characters uses a buffer different from a buffer used in a standard read operation. In some embodiments, the data structure comprises a data base.

In another embodiment, a data storage device is provided comprising: a memory; and means for performing on-the-fly data replacement during a read operation of a data structure stored in the memory based on previously-stored information identifying locations of the data to be replaced.

Other embodiments are possible, and each of the embodiments can be used alone or together in combination. Accordingly, various embodiments will now be described with reference to the attached drawings.

EMBODIMENTS

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
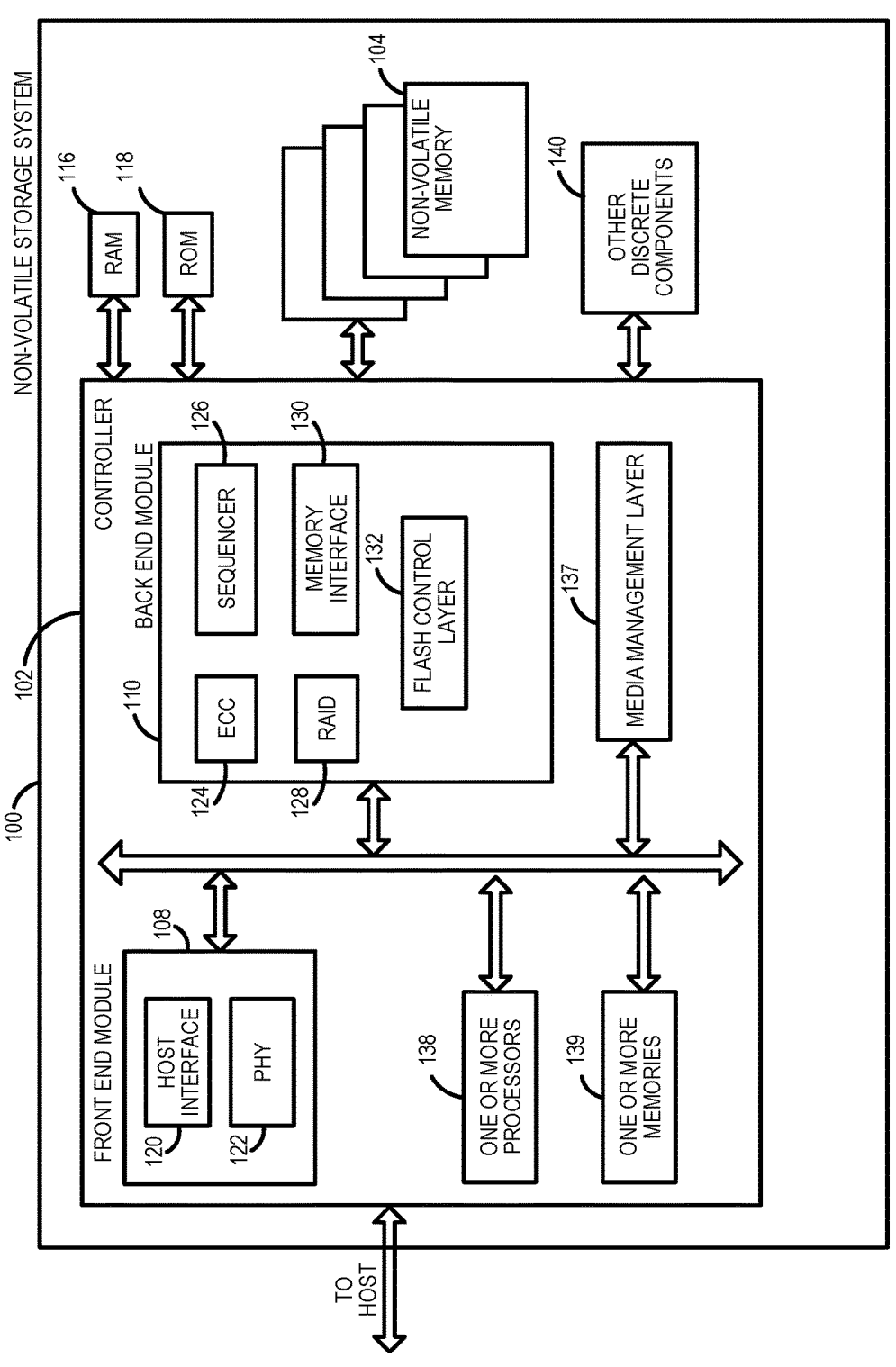
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller are optional components that are not necessary in the controller 102.

Figure 2B:
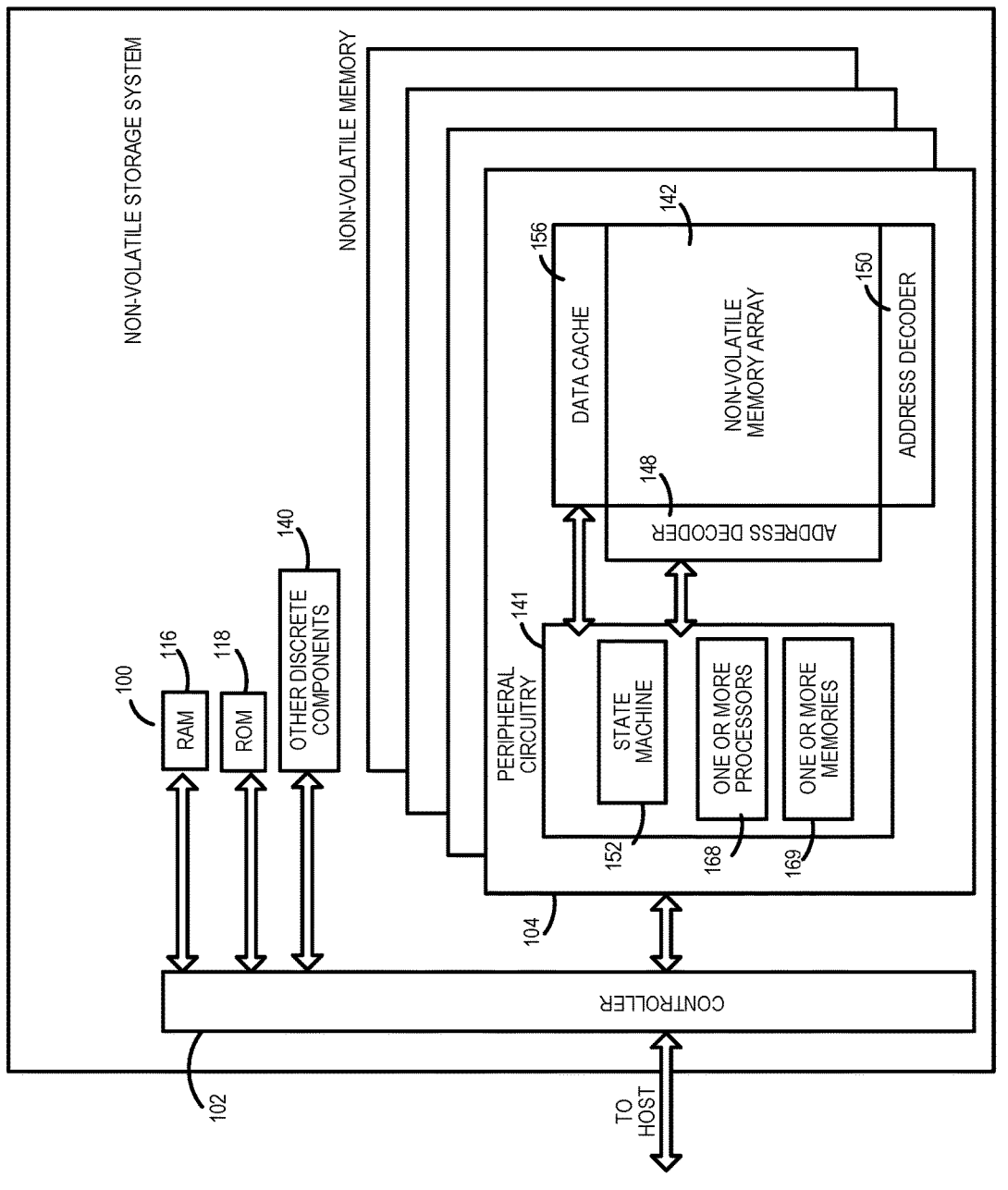
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data and address decoders 148, 150. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
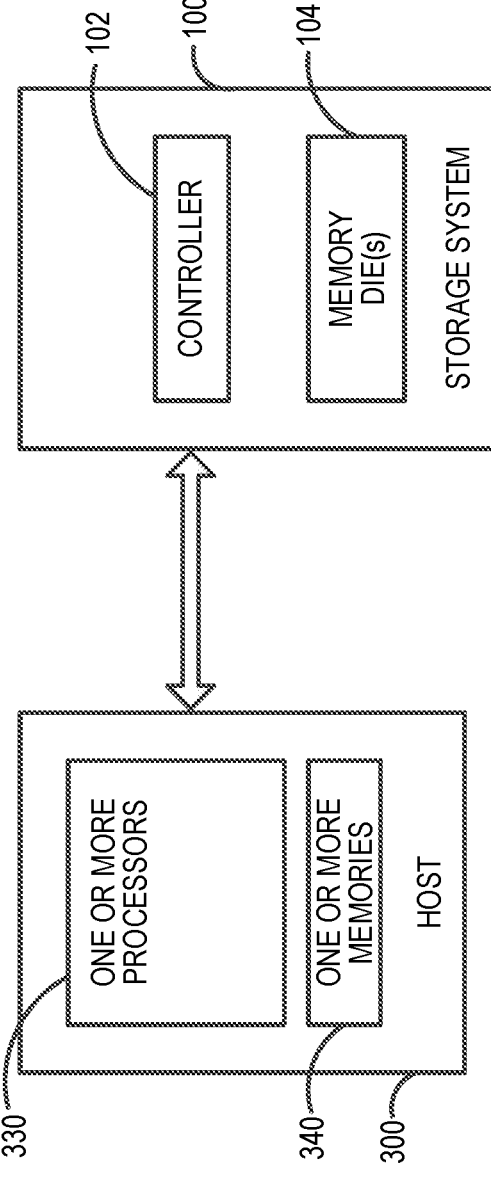
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As mentioned above, a data storage device can be used to store a database (or other data structure), which can be read by a host. When processing the database for data analysis, the host may need to perform value replacement (e.g., the completion and/or replacing of missing values inside the database when a "not a number (NaN)" is written instead of a value). After the host reads the database from the data storage device, the host can replace the NaN values with some default values, such as 0 or an average column value. However, having the host perform the replacement after the database is loaded from the data storage device can require some effort and result in latency. Also, the database is seldom stored after the replacement is conducted, as there is value in keeping the original data without the replacement to distinguish between real values and replaced values.

In the following embodiments, the controller 102 of the data storage device 100 is configured to optimize this replacement procedure by performing missing-values pre-processing of a data structure (such as a database) stored in the memory 104 of the data storage device 100. These embodiments can reduce the latency and computational overhead of the value replacement operation. In one example implementation (other implementations can be used), the controller 102 is configured to optimize the replacement of specific patterns in the stored data structure. The following examples of this embodiment will be illustrated using a database, but it should be understood that data structures other than a database can be used.

In one example, the controller 102 of the data storage device 100 is configured to mark written replaceable patterns, so that the controller 102 can perform on-the-fly replacement of the patterns during a read operation. Patterns can take any suitable form, such as, but not limited to, specific characters, regular expressions, or a predefined bit sequence which is otherwise unused in a structure stored persistently in the memory 104 of the data storage device 100. For simplicity, this example will use a special character replacement, but it should be understood that the claims are not so limited unless expressly recited therein.

Figure 4:
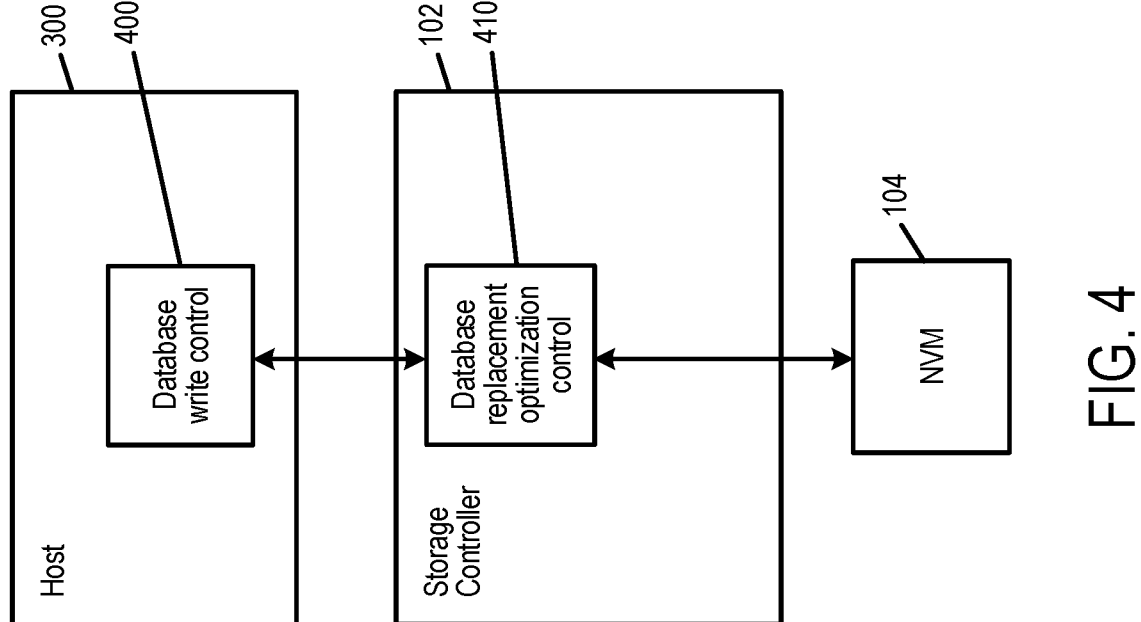
FIG. 4 is an illustration of an architecture of an embodiment.

FIG. 4 is an example architecture of an embodiment. As shown in FIG. 4, in this example, the host 300 comprises a database write control module 400, which can be provided by the host's one or more processors 330, individually or in combination, executing instruction code stored in the host's one or more memories 340. As also shown in FIG. 4, the data storage device's controller 102 in this example comprises a database replacement optimization control module 410, which can be provided by the controller's one or more processors 168, individually or in combination, executing instruction code stored in a memory of the data storage device 100. It should be understood that the database write control module 400 and the database replacement optimization control module 410 can be located in other locations (e.g., in a connecting layer between the controller 102 and the host 300).

In this example, when the host 300 is writing special characters that belong to the database, the database replacement optimization control module 410 can insert the locations of these special characters as meta-data. The locations can be stored in a page-plus-offset format or in a compressed format (e.g., if there is a long range of special characters). The indication to the locations of the special characters can hasten the replacement operation during the read of these characters. It should be noted that, in this example, the original data is stored fully in the memory 104, and the replacement is optional. The original data may be read if no replacement is requested by the database write/read control.

This can also be denoted as a "computational" read with the replacement or as a "regular" read without the replacement.

The database write control module 400 can define the special characters or patterns to be used. For example, the sequence for "NaN" may be used in an integer field to indicate a value that is not a number, and the replacement to be used can be a 0 or 1.

Figure 5:
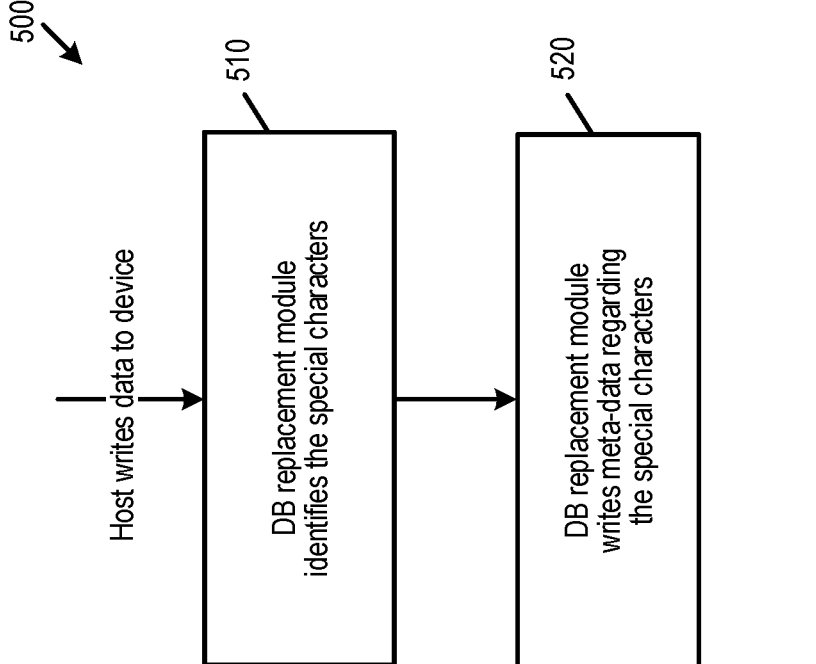
FIG. 5 is a flow chart for a write operation of an embodiment.

FIG. 5 is a flow chart 500 illustrating a write operation of an embodiment. As shown in FIG. 5, when the host 300 writes data to the data storage device 100, the controller 102 (e.g., using the database replacement module 410) identifies special characters in the data (act 510) and writes meta-data regarding the location of the special characters (act 520). Special characters can be defined by the host 300 through the database write control module 400. The replacement character for each special character, as well as the granularity of the data defined as "character," may also be defined through this interface.

Figure 6:
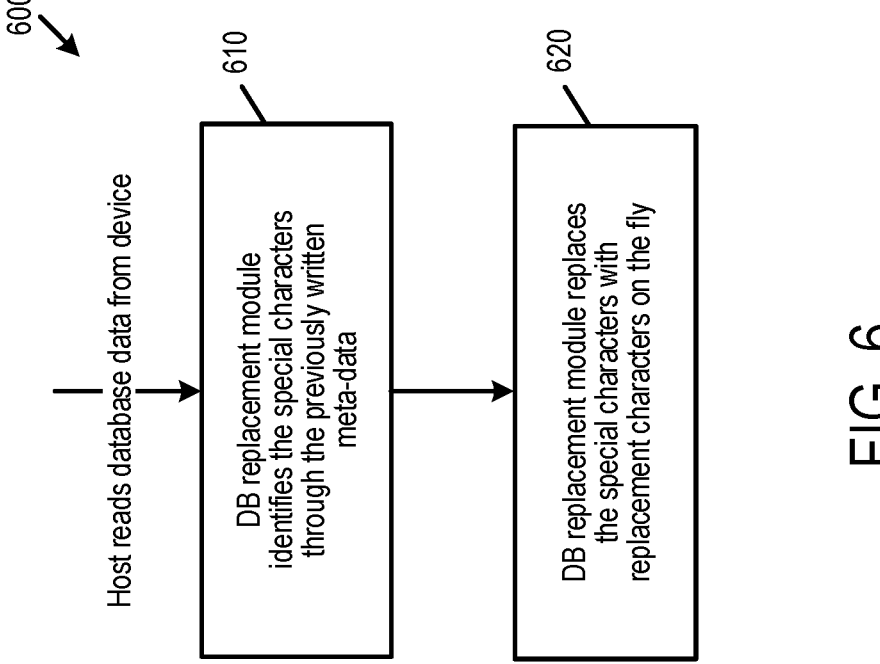
FIG. 6 is a flow chart for a read operation of an embodiment.

FIG. 6 is a flow chart 600 illustrating a read operation of an embodiment. As shown in FIG. 6, when the host 300 reads database data from the data storage device 100, the controller 102 (e.g., using the database replacement module 410) identifies special characters through the previously-written meta data (act 610) and replaces the special characters with replacement characters on-the-fly (act 620). So, in this example, when the database data is set to be read, the database replacement module 410 can read the meta data and replace each of the special characters in the read data with the replacement character. The meta data can be stored in the non-volatile memory 104 and loaded when the database write/read control module 400 indicates that the database will be read.

There are several advantages associated with these embodiments. For example, using these embodiments can reduce power consumption, latency, and host overhead when reading large databases. Computational storage is a highly sought after, and these improvements are beneficial.

There are many alternatives that can be used with these embodiments. For example, the database replacement module 410 can be integrated with the values of a key value (KV) database. The special characters can be represented as values of KV pairs, and their replacement may occur during the reading of the database.

Also, if the replacement changes the length of the payload, the replacement algorithm can indicate this as part of the read operation. For example, the database read operation may be required to allocate additional buffers if the replacement increases the payload size. Since logical block addressees (LBAs) are fixed-length, a padding replacement can be used in this instance. For example, whitespace defined in a comma-separated value (CSV) file may be reduced to allow for replacements of variable length in a field. If the replacement cannot fit into the buffer provided by the host 300, the computational protocol may indicate additional buffer spaces that can be used for this purpose. Also, computational read can be performed using a different memory buffer than a standard read. Embodiments can leverage NVMe Technical Proposals 4091, 4131, and 4184, which define semantics for computational storage, to address the communication between the host 300 and the data storage device 100.

Finally, as mentioned above, any suitable type of memory can be used.

Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
a memory;
a first buffer configured for use in a read operation; and
a second buffer configured for use in a computational-read-with-replacement operation; and
one or more processors, individually or in combination, configured to:
receive data to be written in a data structure;
analyze the data for a predetermined pattern;
write the data in a plurality of storage locations in the memory;
write, in the memory, information about which storage locations store the predetermined pattern;
in response to receiving a read command from a host to read the data structure:
read, from the memory, the data from the data structure but not the information about which storage locations store the predetermined pattern; and
store the read data in the first buffer; and
in response to receiving a computational-read-with-replacement command from the host to read the data structure:
read, from the memory, both the data from the data structure and the information about which storage locations store the predetermined pattern;
store, in the second buffer, the read data and the information about which storage locations store the predetermined pattern; and
use the information about which storage locations store the predetermined pattern to perform on-the-fly replacement of the predetermined pattern with a replacement pattern.

2. The data storage device of claim 1, wherein:
the one or more processors, individually or in combination, are further configured to:
in response to receiving the read command from the host to read the data structure, provide the data to the host without replacing the predetermined pattern with the replacement pattern.

3. The data storage device of claim 1, wherein the predetermined pattern comprises a "not a number (NaN)" character and the replacement pattern comprises a number.

4. The data storage device of claim 1, wherein the predetermined pattern comprises a specific character.

5. The data storage device of claim 1, wherein the predetermined pattern comprises a regular expression.

6. The data storage device of claim 1, wherein the predetermined pattern comprises a predefined bit sequence.

7. The data storage device of claim 1, wherein the information about which storage locations store the predetermined pattern is stored in a page-plus-offset format.

8. The data storage device of claim 1, wherein the information about which storage locations store the predetermined pattern is stored in a compressed format.

9. The data storage device of claim 1, wherein the predetermined pattern is defined by the host.

10. The data storage device of claim 1, wherein the predetermined pattern is represented as values of a key value (KV) pair.

11. The data storage device of claim 1, wherein the data structure comprises a data base.

12. The data storage device of claim 1, wherein the memory comprises a three-dimensional memory.

13. The data storage device of claim 1, wherein the replacement pattern is defined by the host.

14. The data storage device of claim 1, wherein the granularity of replacement is defined by the host.

15. A data storage device comprising:
a memory;
a first buffer configured for use in a read operation;
a second buffer configured for use in a computational-read-with-replacement operation; and
means for:
receiving data to be written in a data structure;
analyzing the data for a predetermined pattern;
writing the data in a plurality of storage locations in the memory;
writing, in the memory, information about which storage locations store the predetermined pattern;
in response to receiving a read command from a host to read the data structure:
reading, from the memory, the data from the data structure but not the information about which storage locations store the predetermined pattern; and
storing the read data in the first buffer; and
in response to receiving a computational-read-with-replacement command from the host to read the data structure:
reading, from the memory, both the data from the data structure and the information about which storage locations store the predetermined pattern;
storing, in the second buffer, the read data and the information about which storage locations store the predetermined pattern; and
using the information about which storage locations store the predetermined pattern to perform on-the-fly replacement of the predetermined pattern with a replacement pattern.

16. A method comprising:
performing in a data storage device comprising a memory, a first buffer configured for use in a read operation, and a second buffer configured for use in a computational-read-with-replacement operation, the method comprising:
receiving data to be written in a data structure;
analyzing the data for a predetermined pattern;
writing the data in a plurality of storage locations in the memory;
writing, in the memory, information about which storage locations store the predetermined pattern;
in response to receiving a read command from a host to read the data structure:
reading, from the memory, the data from the data structure but not the information about which storage locations store the predetermined pattern; and
storing the read data in the first buffer; and
in response to receiving a computational-read-with-replacement command from the host to read the data structure:
reading, from the memory, both the data from the data structure and the information about which storage locations store the predetermined pattern;

storing, in the second buffer, the read data and the information about which storage locations store the predetermined pattern; and using the information about which storage locations store the predetermined pattern to perform on-the-fly replacement of the predetermined pattern with a replacement pattern.

17. The method of claim 16, further comprising:

informing the host that the replacement pattern changed a length of a read payload.

18. The method of claim 17, further comprising:

allocating an additional buffer to accommodate the changed length.

19. The method of claim 17, further comprising:

reducing whitespace defined in a comma-separated value (CSV) file to accommodate the changed length.

20. The method of claim 16, wherein the data structure comprises a data base.

\* \* \* \* \*